United States Patent

Holding

[11] Patent Number: 6,098,763
[45] Date of Patent: Aug. 8, 2000

[54] ELECTRICALLY-OPERATED DISC BRAKE ASSEMBLIES FOR VEHICLES

[75] Inventor: Keith Lawrence Holding, Birmingham, United Kingdom

[73] Assignee: Lucas Industries public limited company, United Kingdom

[21] Appl. No.: 09/043,207

[22] PCT Filed: Sep. 13, 1996

[86] PCT No.: PCT/GB96/02255

§ 371 Date: May 14, 1998

§ 102(e) Date: May 14, 1998

[87] PCT Pub. No.: WO97/10449

PCT Pub. Date: Mar. 20, 1997

[30] Foreign Application Priority Data

Sep. 13, 1995 [GB] United Kingdom ............... 9518722

[51] Int. Cl.⁷ ........................................ B60L 7/00
[52] U.S. Cl. .................. 188/158; 188/72.1; 188/72.8; 188/162
[58] Field of Search ........................ 188/158, 162, 188/156, 72.7, 72.8, 106, 106 R, 106 F, 106 P, 106 A, 72.1

[56] References Cited

U.S. PATENT DOCUMENTS 4,809,824  3/1989  Fargier et al. .
5,161,650  11/1992  Taig ............................ 188/72.8
5,348,123  9/1994  Takahashi et al. ............ 188/72.1
5,379,867  1/1995  Macke et al. ................. 188/71.9
5,520,267  5/1996  Giering et al. ............... 188/72.9
5,722,516  3/1998  Forni et al. .................. 188/71.9
5,819,884  10/1998  Giering ....................... 188/71.9

FOREIGN PATENT DOCUMENTS

WO 88/04741  6/1988  WIPO .
WO 89/10496  11/1989  WIPO .

*Primary Examiner*—Paul N. Dickson
*Assistant Examiner*—Pamela J. Lipka
*Attorney, Agent, or Firm*—MacMillan, Sobanski & Todd, LLC

[57] ABSTRACT

An electrically operated disc brake assembly for vehicles of the kind in which a friction member (9) is adapted to be applied to a rotatable brake disc (2) by a brake applying mechanism which includes an electric motor (3) and a transmission which is adapted to apply an axially directed brake applying force to the friction member (9) in response to operation of the motor (3) so that the transmission acts on the friction member (9) at circumferentially spaced locations. This produces a substantially even loading across the friction member/disc interface, reducing the magnitude of the reaction torque. In one embodiment, the transmission comprises a pair of axially spaced screw devices (4,5) which are rotatable by the motor (3) acting through a common gear train (6), and the motor may further be provided at the center of mass of the brake.

9 Claims, 5 Drawing Sheets

ELECTRICALLY-OPERATED DISC BRAKE ASSEMBLIES FOR VEHICLES

This invention relates to improvements in electrically-operated disc brake assemblies for vehicles the kind in which a friction member is adapted to be applied to a rotatable brake disc by brake-applying means including an electric motor which forms part of the assembly, and transmission means adapted to apply an axially directed brake-applying force to the friction member in response to operation of the motor.

A brake of the kind set forth is known from EP-A-0 339 024. In the brake of EP-A-0 339 024 the electric motor is used to drive an input to a reduction gear box, and the gear box is adapted to translate high speed movement of the motor into a controlled high torque output to a transmission means in the form of a screw device in turn adapted to displace the friction member axially with respect to the disc.

In the brake of EP-A-0 339 024 the electric motor, the gear box, and the screw device are arranged in series. Since these components are arranged sequentially the brake assembly, in consequence, is of substantially large overall size. Moreover, the motor is displaced by the gearbox to a position which is some distance from mounting points for the brake. The large mass of the motor therefore applies a moment force to the brake assembly. Under normal running conditions of a vehicle, large accelerations or vibrations are applied to the wheel, and therefore to the brake, as the wheel passes over irregularities in the road. These already large forces tend to generate extremely large vibrations in the motor and the brake assembly, which may be made worse because the motor overhangs the brake mounting points. The brake of EP-A-0 339 024 needs to be sufficiently robust to withstand the all aforementioned vibrations and high forces which might otherwise lead to fatigue or similar stress failures within the motor and brake. Such robustness is normally achieved by strengthening the appropriate parts which adds to the overall mass of the brake assembly. This is obviously undesirable since increasing the unsprung mass of the vehicle can lead to vehicle handling problems associated both with steering and suspension design and control.

In the brake disclosed in EP-A-0 339 024, the screw device for applying a brake-applying force to the friction member is of unitary construction. The single screw applies a clamp load substantially at the geometric centre of the friction member. As the centre of pressure of the friction member is offset from the, geometric centre of the friction member, a single point loading offset from the centre of pressure can generate a reaction torque on the friction member which is in addition to the normal brake torque. Since the reaction torque and the normal brake torque have to be supported by the brake housing, it may be necessary for the support or abutment locations for the friction member to be strengthened. Again, any such additional strengthening will result in an increase in the overall mass of the brake assembly with the consequence advantages discussed above.

According to our invention, we provide an electrically operated disc brake assembly for vehicles comprising a friction member which is adapted to be applied to a rotatable brake disc by braking applying means, the brake applying means including an electric motor, and further comprising a transmission means which is adapted to apply an axially directed brake applying force to the friction member in response to operation of the motor, in which the transmission means acts on the friction member at circumferentially spaced locations and comprises a pair of circumferentially spaced screw devices, which are simultaneously rotatable by the electric motors to apply the axially directed forces to the friction member, characterised in that the electric motor is adapted to act on the screw devices, through a common gear train arranged to be located adjacent the rear face of the friction member.

This produces a substantially even loading across the friction member/disc interface, thereby reducing the magnitude of the reaction torque.

Preferably the transmission means comprises a pair of circumferentially spaced screw devices which are simultaneously rotatable by the electric motor to apply the axially directed forces to the friction member, the electric motor acting on the screw devices through a common gear train.

This provides a compact assembly which is particularly compact in an axial direction to facilitate installation in a space which is limited axially but which may be substantial in a circumferential direction.

Preferably the gear train comprises a set of reduction spur gears so arranged that the electric motor providing an input drive is located in substantially the centre of mass of the brake.

Preferably the gear train is arranged to provide a number of drive outputs from the single input drive which comprises a single motor shaft.

In one construction the drive input from the motor may be derived from one end of the motor.

Alternatively in another construction both ends of the motor are adapted to be arranged to provide at least one of the inputs required for the given number of drive outputs.

Alternatively, the gear train may be arranged to be located at a position remote from the friction member. This has the advantage that since the gear train is remote from the braking faces the gear wheels constituting the train will be subjected to substantially lower temperatures. As a consequence they can be constructed from a synthetic plastics material, thereby reducing the overall weight of the brake assembly. In addition the displacement sensor may be operatively connected to at least one of the screw devices for providing signals indicative of the screw movement, which, in turn, may be used to provide signals indicative of wear of the friction member.

Some embodiments of our invention are illustrated in the accompanying drawings in which.

Figure 1:
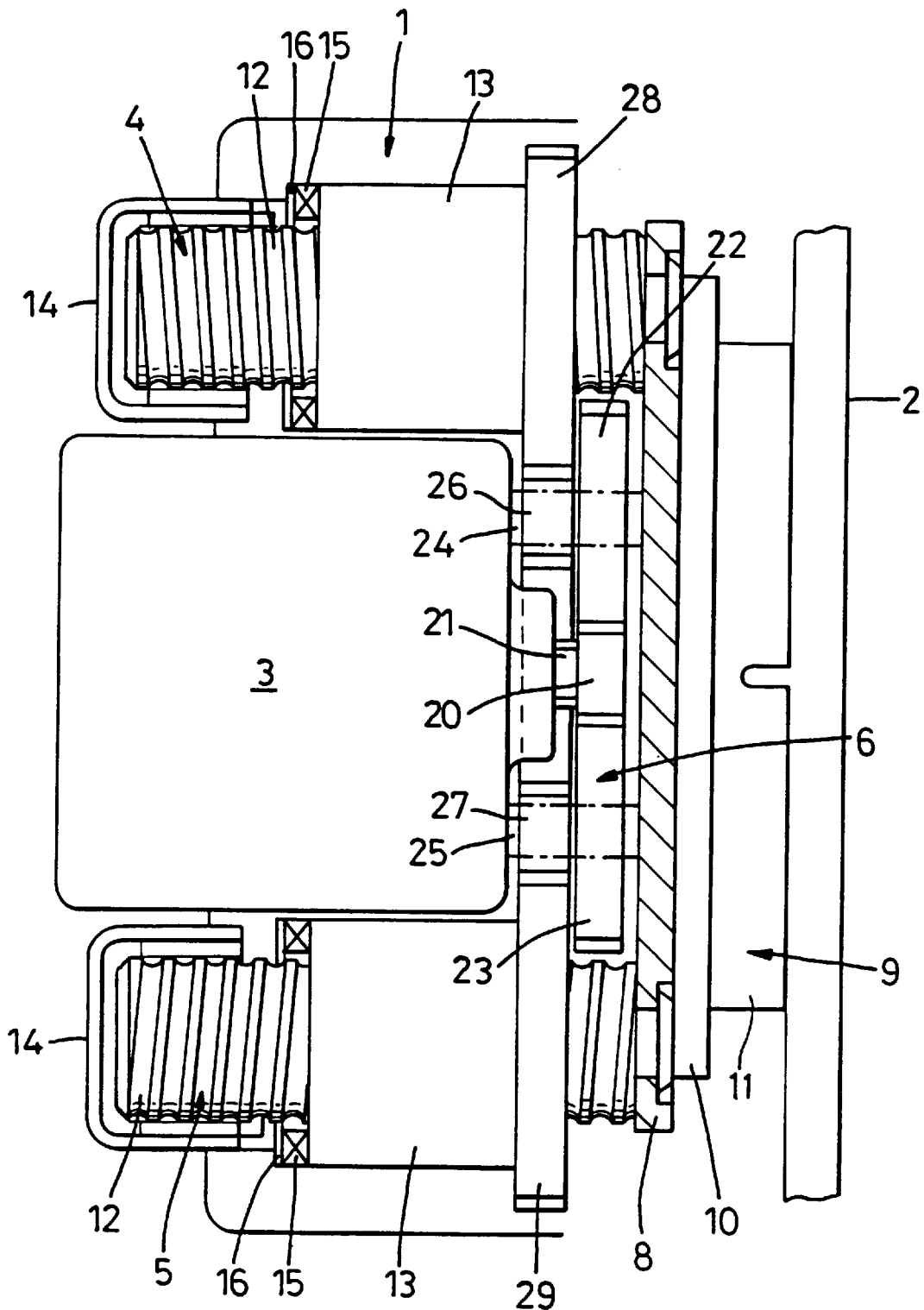
FIG. 1 is a plan of an electrically-operated brake.

In the electrically-operated brake illustrated in FIG. 1 of the accompanying drawings a stationary brake carrier 1, in the form of a metal casting or forging, is attached by mounting points to a fixed part adjacent to one face of a disc 2 rotatable with a wheel of a vehicle. The carrier 1 comprises a mounting for an electric motor 3 which is located in a housing and is adapted to drive transmission means comprising a pair of screw devices 4,5 through a gear train 6. Screw devices 4,5 are circumferentially spaced at opposite ends of the motor 3 and co-operate at circumferentially spaced positions on a pressure plate 8, in turn acting on a friction member 9 which it carries. The friction member 9 comprises a rigid backing plate 10 for carrying a lining 11 of friction material for engagement with the disc 2.

The screw devices are of opposite hands, and each screw device 4,5 comprises a non-rotatable ball screw 12 defining the strut in screw-threaded engagement with a nut 13. The strut 12 projects from the nut 13 at its inner end for engagement with the pressure plate 8, and at its outer end which is received in an end cover 14. The nuts 13 are rotatably mounted in the brake and abut at their outer ends against rotatable thrust bearings 15 received in annular recesses 16 in the carrier 1.

Figure 2:
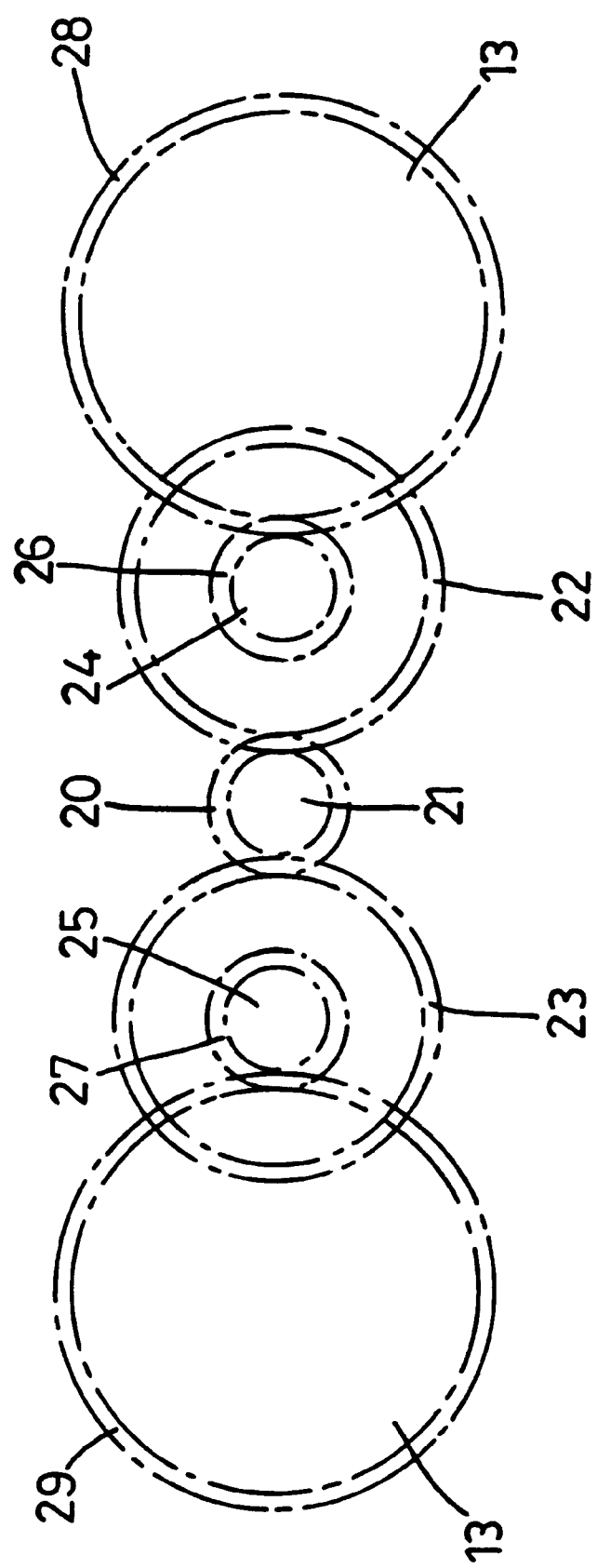
FIG. 2 is a layout of a gear train for the brake of FIG. 1.

The gear train 6 illustrated in detail in FIG. 2 comprises a gear wheel 20 mounted on an output shaft 21 driven by the motor 3. The gear wheel meshes 20 with a pair of idler gear wheels 22,23 which are carried by stub axles 24,25 projecting forwardly from the housing of the motor 3. A pair of gear wheels 26,27, substantially of smaller diameters than the gearwheels 22,23, are also fast with the axles 24,25 and are located between the housing and the gear wheels 22,23. The gear wheels 26,27 mesh with a ring of circumferentially spaced teeth 28,29 on the peripheral edge of each nut 13.

Operation of the electric motor 3 causes the gear wheel 20 to rotate in turn acting through the gears 22,26,23,27, to cause the nuts 13 to rotate simultaneously in opposite directions.

Since the screw devices 4,5 are of opposite hands, rotation of the motor 3 in one direction causes the struts to move in one direction to urge the friction pad 11 into engagement with the disc 2 when the brake is to be applied, and in the opposite direction to release the brake following a brake application.

In the application of the brake, the reaction on the friction member 9 is transmitted through the nut 13 and onto the carrier 1 through the bearings 15.

Since the gear train 6 is substantially flat or of low profile, the electric motor 3 can be placed at substantially the geometric centre of the brake assembly. This provides a compact assembly without any large masses suspended at great distances from the mounting points for the brake in the vehicle.

The brake described above is of the sliding calliper type, in which a second friction member, not shown, is adapted to be applied to the opposite face of the disc by means of a caliper or clamping member which is mounted on the carrier for relative axial movement to transmit the brake applying force to the second friction member. Such a known brake is disclosed in GB-A-1 381 709.

Figure 3:
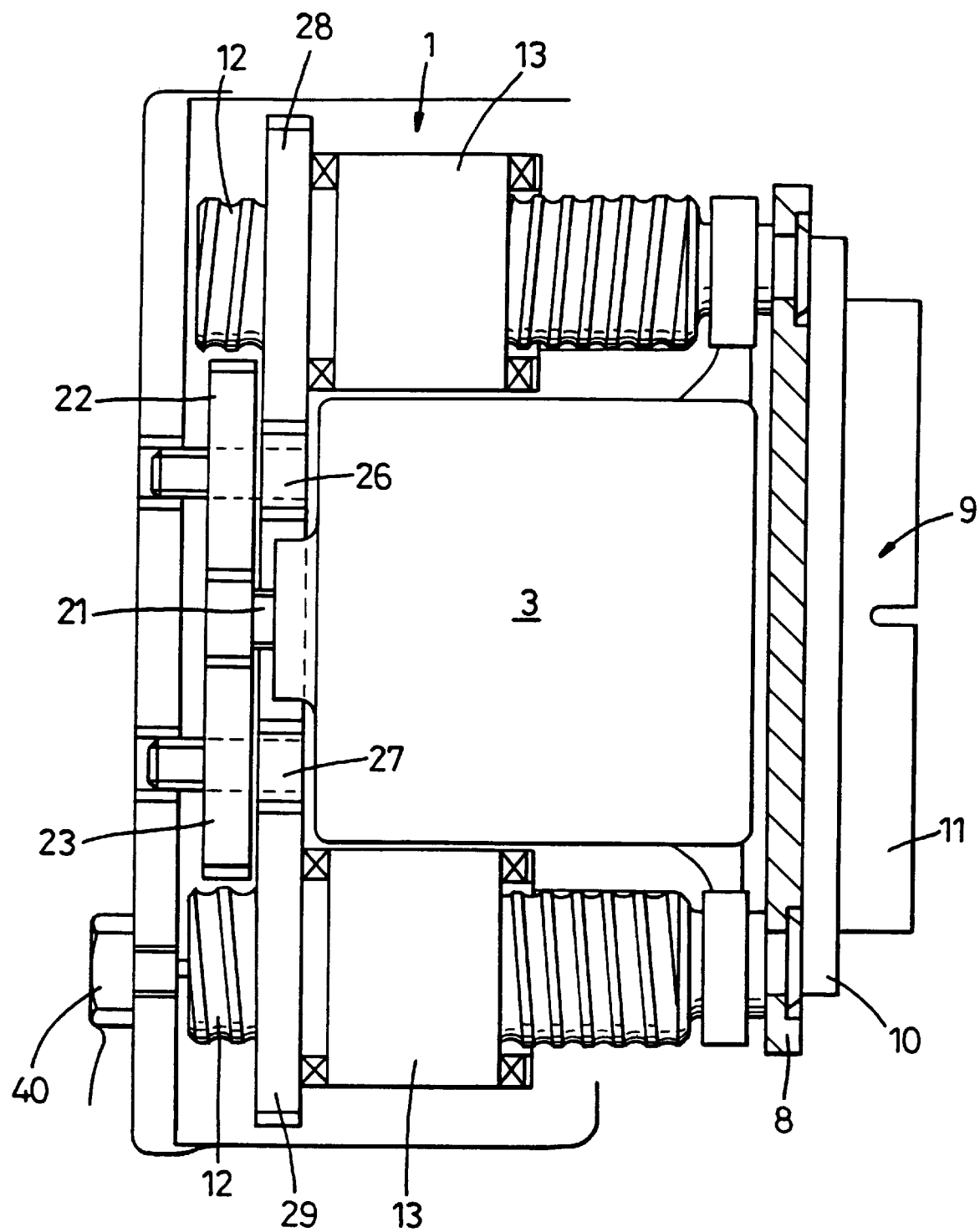
FIG. 3 is a view similar to FIG. 1 of another electrically-operated brake, incorporating a displacement sensor.

In the brake illustrated in FIG. 3 of the accompanying drawings the position of the motor 3, the screw devices 4,5 and the gear train 6, is reversed. As illustrated a gear train 6 is located at the end of the motor 3 remote from the disc 2. Since the gear train 6 is remote from the braking faces the gear wheels operate at substantially lower temperatures. This enables the gear wheels, if desired, to be manufactured from synthetic plastics materials with the advantage that the overall weight of the assembly can be reduced accordingly.

A displacement sensor 40 can be incorporated in the carrier 1 for co-operation with the strut 12 of the screw device 5 in order to provide signals indicative of screw movement in an axial direction, in turn to provide an indication of wear of the friction lining 11.

The construction and operation of the brake of FIG. 3 are otherwise the same as that of FIGS. 1 and 2 and corresponding reference numerals have been applied to corresponding parts.

Figure 4:
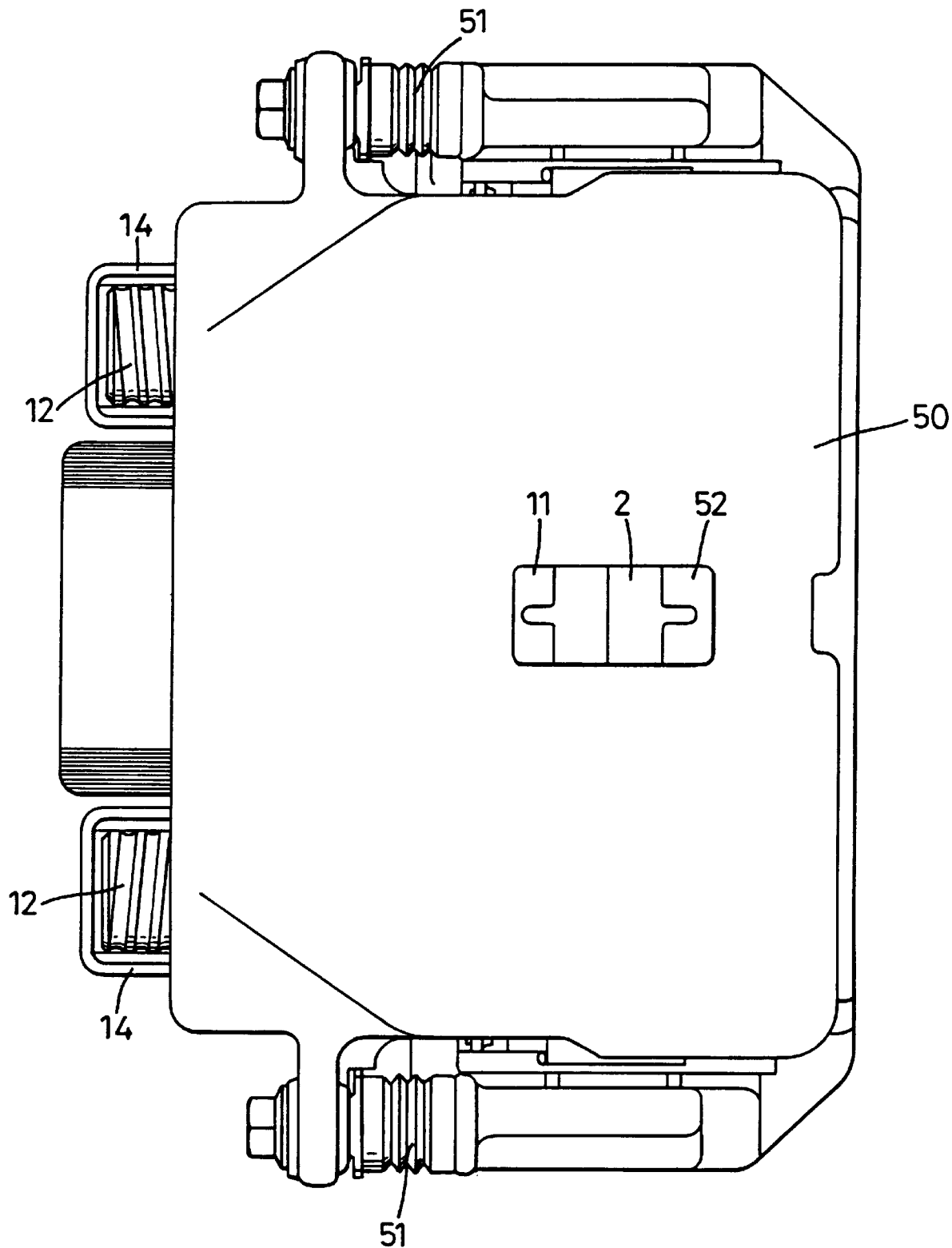
FIG. 4 is a plan of yet another electrically-operated brake.
Figure 5:
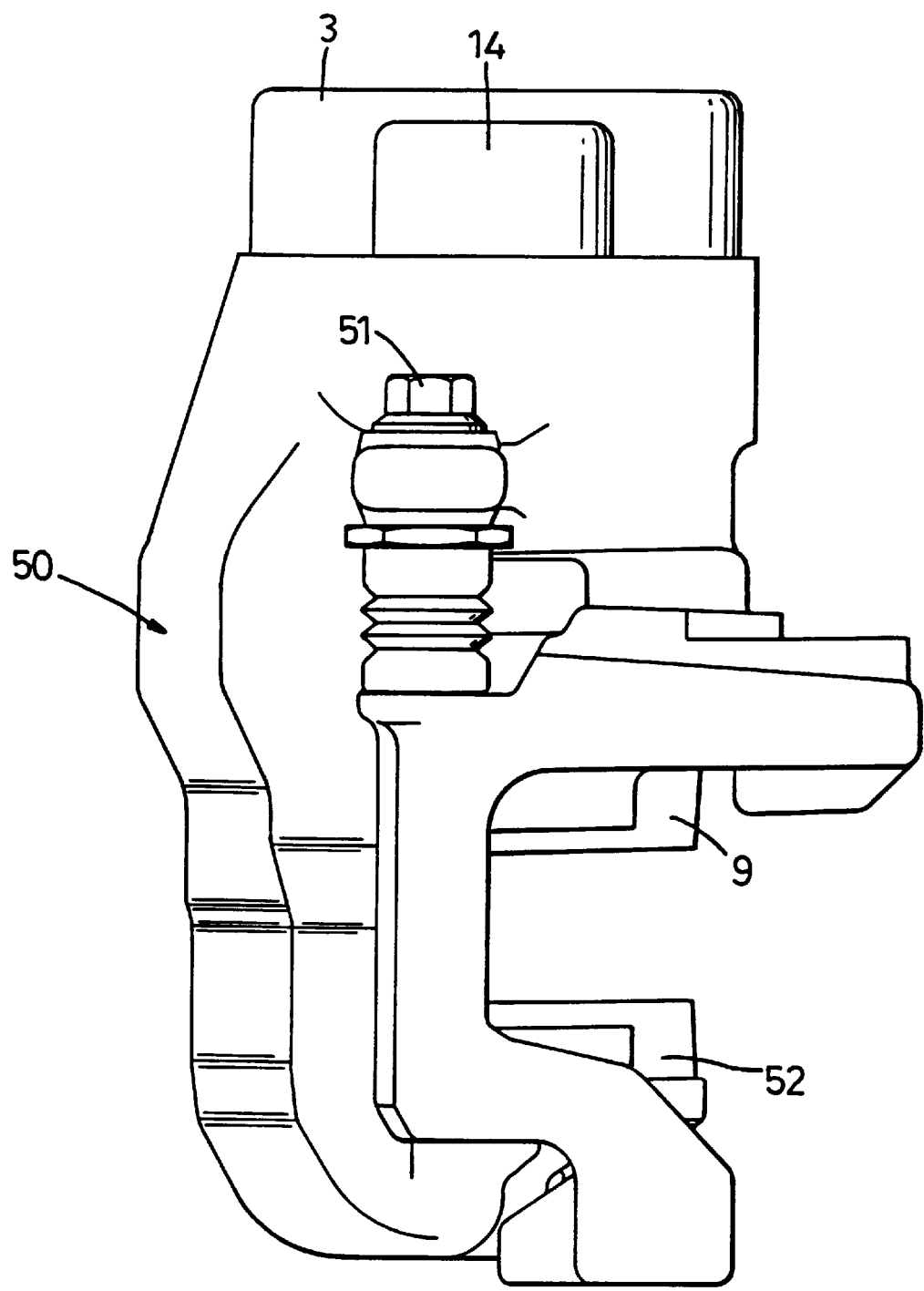
FIG. 5 is a side view of the brake of FIG. 4.

In the brake illustrated in FIGS. 4 and 5 of the accompanying drawings, a crown 50, defining a caliper or clamp member, is mounted on top of the carrier 1 and the motor 3. The crown 50 is guided for axial sliding movement on the carrier 1 by circumferentially spaced sealed guide pins 51 of known construction and which are located at opposite ends of the brake assembly.

When the brake is operated the carrier 50 is adapted to move axially to transmit a brake applying force to a second friction member 52 as the friction member simultaneously with the friction member 9 being applied to the disc by operation of the electric motor 3 as described.

I claim:

1. An electrically operated disc brake assembly for vehicles comprising a friction member which is adapted to be applied to a rotatable brake disc by braking applying means, the brake applying means including an electric motor, and further comprising a transmission means which is adapted to apply an axially directed brake applying force to the friction member in response to operation of the motor, in which the transmission means acts on the friction member at circumferentially spaced locations and comprises a pair of circumferentially spaced screw devices which are simultaneously rotatable by the electric motor to apply the axially directed forces to the friction member, characterized in that the electric motor is adapted to act on the screw devices through a common gear train arranged to be located proximate the rear face of the friction member.

2. An electrically operated disc brake assembly according to claim 1 which the gear train comprises a set of reduction spur gears.

3. An electrically operated brake according to claim 1 which the electric motor which provides an input drive is located in substantially the center of mass of the brake.

4. An electrically operated disc brake assembly according to claim 1 in which the gear train is arranged to provide a number of drive outputs from the single input drive which comprises a single motor shaft.

5. An electrically operated disc brake assembly according to claim 1 in which the drive input from the motor is derived from one end of the motor.

6. An electrically operated disc brake assembly according to claim 1 in which both ends of the motor are adapted to be arranged to provide at least one of the inputs required for a given number of drive outputs.

7. An electrically operated disc brake assembly according to claim 1 in which the gear wheels are constructed from a synthetic plastics material.

8. An electrically operated disc brake assembly according to claim 1 in which a displacement sensor is operatively connected to at least one of the screw devices for providing signals indicative of the screw movement.

9. An electrically operated disc brake assembly according to claim 8 in which signals are adapted to produce signals indicative of wear of the friction member.

* * * * *